UNITED STATES PATENT OFFICE.

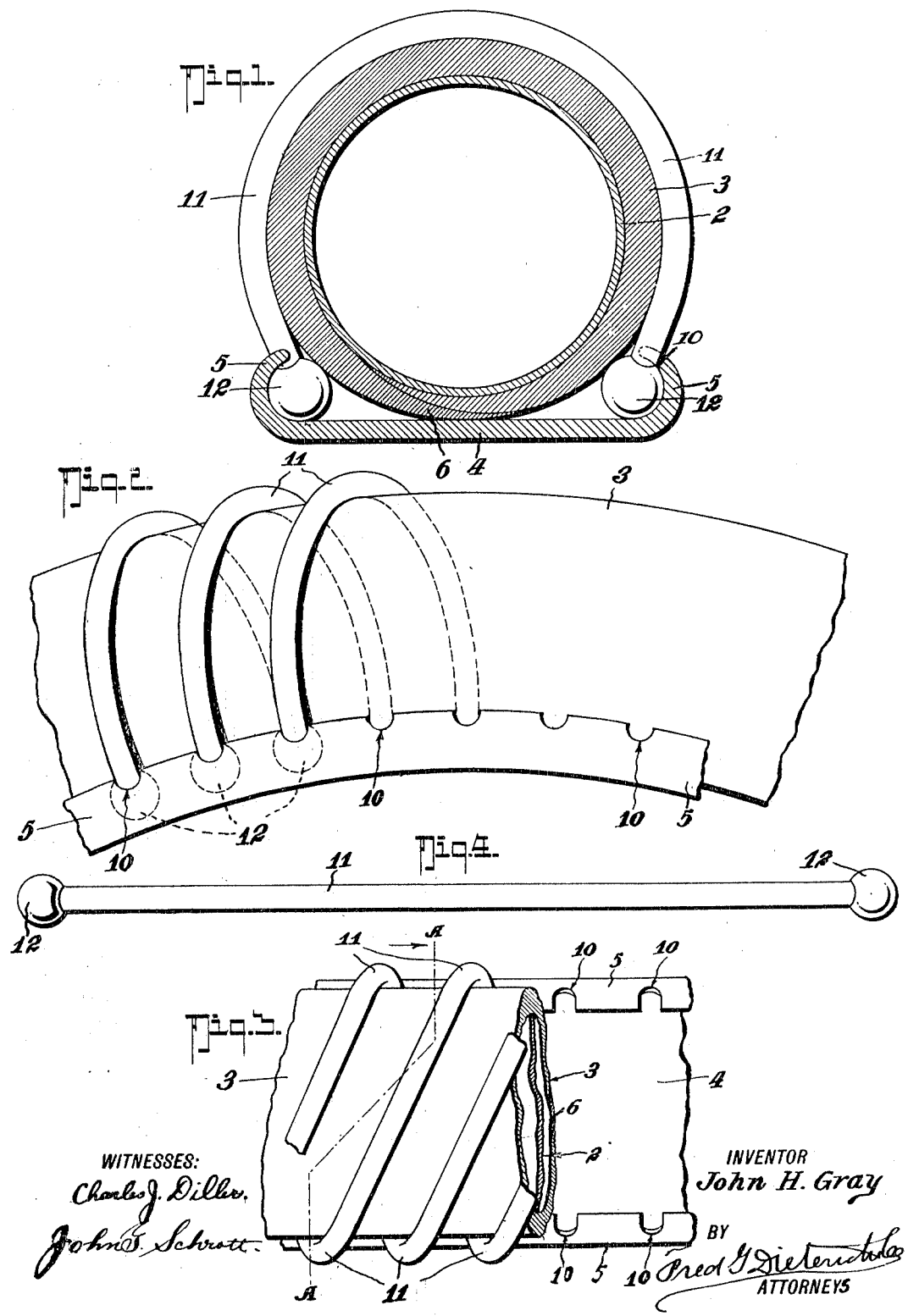

JOHN H. GRAY, OF VANCOUVER, BRITISH COLUMBIA, CANADA.

PNEUMATIC TIRE.

1,120,052.     Specification of Letters Patent.     Patented Dec. 8, 1914.

Application filed May 23, 1914. Serial No. 840,452.

*To all whom it may concern:*

Be it known that I, JOHN H. GRAY, a citizen of the Dominion of Canada, residing at Vancouver, in the Province of British Columbia, Canada, have invented certain new and useful Improvements in Pneumatic Tires, of which the following is a specification.

This invention relates to an improvement in the means for retaining a pneumatic tire on the rim of the wheel and for reinforcing the strength of the outer tire covering and providing a valuable anti-slipping and anti-skidding device.

It is designed as an improvement on what has been called a cable tire wherein the outer tire covering is retained on the rim by short lengths of flexible cable extending across from one side of the rim to the other around the outer covering and the improvement is particularly directed to the manner of attaching these short lengths of cable to the rim of the wheel.

The invention is particularly described in the following specification, reference being made to the drawings by which it is accompanied, in which:

Figure 1 is a cross section of the tire rim and tire showing the cable attachment. Fig. 2 a side view of a portion of the tire and rim. Fig. 3 is a plan of a portion of the tire and its rim, and Fig. 4, a view of a cable length detached.

In these drawings 2 represents the inner tube of the tire, 3 the outer casing or protective covering of the inner tube, and 4 the rim of the wheel which is provided with an inwardly turned lip 5 on each side, such as is commonly used to retain the outer casing in position. These retaining lips 5 may be integral with the rim 4 or may be detachable to facilitate the removal of the tire from the wheel and its replacement. The outer casing 3 of this tire, instead of being provided with wired projecting edges to engage the retaining lips 5, is of substantially uniform thickness and the edges are reduced from opposite faces to form an overlapped or spliced joint at 6 between the retaining lips 5. At intervals apart around the circumference of the wheel the lips 5 of the rim 4 are provided with a series of notches 10 at any convenient distance apart. The outer covering 3 of the tire is retained in position on the inner tube 2 and on the rim of the wheel 4 by short lengths 11 of flexible metal, such as wire rope cable or chain, each end of which has a retaining enlargement 12 formed on it, either by inserting and securing its ends in small spherical shaped beads or by any convenient means. These enlarged ends are inserted within the lip 5 of the rim with the wire rope passing through a notch 10 in the edge of the lip. These lengths 11 of wire rope may extend directly across the tire or may be carried obliquely across, as shown in the drawing, and are retained in position by the expansion of the tire when inflated.

No claim is made to the use of the short lengths 11 of cable or chain as a means for retaining the tire in position on the rim but positive claim is made to the manner of attachment of these lengths of cable to the rim by the use of an enlarged end 12 and particularly to the use of the notches 10 in the inwardly turned edges 5 of the tire rim or an equivalent retaining ring, if such is used.

Having now particularly described my invention, I hereby declare that what I claim as new and desire to be protected in by Letters Patent, is:

In a pneumatic tire the combination with the inner tube, the outer casing and the retaining ring on the felly of the wheel having an inwardly turned edge on each side, which edges are notched at intervals apart around the circumference with U-shaped notches, lengths of flexible material having ball enlargements at each end, said flexible members adapted to be inserted into said notches with the balls located in the inwardly turned edge of the rings between the same and the outer casing.

In testimony whereof I affix my signature in presence of two witnesses.

JOHN H. GRAY.

Witnesses:
ROWLAND BRITTAIN,
MAY WHYTE.

Copies of this patent may be obtained for five cents each, by addressing the "Commissioner of Patents Washington, D. C."